United States Patent

[11] 3,630,379

| [72] | Inventor | Thomas Davy Sharples<br>Atherton, Calif. |
| [21] | Appl. No. | 61,885 |
| [22] | Filed | Aug. 7, 1970 |
| [45] | Patented | Dec. 28, 1971 |
| [73] | Assignee | Pennwalt Corporation<br>Philadelphia, Pa. |

[54] STEP RING CENTRIFUGE SCREEN
5 Claims, 4 Drawing Figs.

[52] U.S. Cl.................................................. 210/369,
210/380, 210/497.1
[51] Int. Cl..................................................... B01d 25/16,
B01d 33/00
[50] Field of Search........................................... 210/369,
380, 497.1

[56] References Cited
UNITED STATES PATENTS

| 3,133,831 | 5/1964 | Lowe et al. | 210/369 X |
| 2,042,537 | 6/1936 | Liddell | 210/497.1 |
| 2,321,207 | 6/1943 | Howe | 210/380 |
| 3,425,561 | 2/1969 | Steele et al. | 210/380 |
| 3,430,772 | 3/1969 | Ranc | 210/380 X |

*Primary Examiner*—Samih N. Zaharna
*Attorneys*—Carl A. Hechmer, Jr. and Earl T. Reichert ABSTRACT: A frustoconically shaped centrifuge screen is formed from a plurality of annular sections, the sections being spaced, apart and increasing in diameter in a direction from the smaller end of the screen to the larger end thereof. The innermost surface of each section is flat, nonplanar with, and located outwardly of that of the preceding section so as to form a stepped diverging axial passage for a mixture introduced into the smaller end of the screen as it rotates about its axis, allowing liquid to pass radially between sections, while solids axially spill from one section to the next.

INVENTOR.
Thomas D. Sharples
BY Earl T. Reinhert
ATTORNEY.

STEP RING CENTRIFUGE SCREEN

BACKGROUND OF THE INVENTION

This invention relates to centrifuges. More specifically, the invention relates to screen centrifuges, and a frustoconically shaped bar screen arranged to form a stepped diverging axial passage for a mixture to be separated therein.

In its preferred form, the centrifuge screen has the configuration of a truncated cone. In a typical application, such as coal dewatering, the frustoconically shaped screen is clamped or bolted into a centrifuge. During operation of the centrifuge, the screen is spun about its axis of rotation, while the mixture to be separated is introduced into the smaller end of the screen. Centrifugal force causes the mixture to spread over the periphery of the screen, the liquid or water flowing radially outwardly through the screen, while solids pass axially along the screen because of its expanding diameter. Continuous conical screen centrifuges are also used for dewatering and washing fibrous, amorphous, and crystalline materials.

The rotating screen must be strong enough to accommodate the substantial stresses involved. Common practice heretofore has included forming heavy gage perforated metal plate in the shape of a conical basket for supporting a relatively thin pervious membrane internally of the basket. The pervious membrane may be fine perforated, etched screen, wire screen, cloth, or the like. In some industries, the practice requires the use of expensive materials, for example stainless steel, for at least the exposed parts of the centrifuge, and particularly the mixture contacting parts. The forming of these centrifuge screens in this manner results in considerable expenditure.

In some cases, the screen itself is formed of a very thin stainless steel sheet having a multitude of holes etched therein: it has been found necessary to form this sheet from a material having the same thickness as the diameter of each of the multitude of holes etched therein. This is generally in the area of 0.003 to 0.060 inch; thus, being formed from such extremely thin material in many cases, these screens are not durable enough to withstand long continuous use. Screens of thickness less than about 0.010 inch usually require a backup screen to extend screen life.

In order to provide for a screen which would withstand long use, contrary to the etched screen, the tendency has been to utilize bar stock in constructing screens. However, in constructing screens from bar stock, the total open area of the screen is substantially reduced from that of an etched screen having holes of the same size. The ratio of the open area to the total screen area is critical in centrifuge screens of this type. In general, the greater the open area, the better the screen. Thus, a screen constructed from bar stock and having openings of 0.006 inch would have an open area comprising about 7 percent of the total screen area, while an etched screen having the same size openings would have an open area comprising about 25 percent of the total screen area.

Also, in the prior art, in passing along the internal or innermost surface of the screen toward the large end thereof, the mixture passes over a conical or frustoconical surface having a plurality of openings or spacings therein, the liquid and finer solids draining through openings or spacings in the screen while larger solids pass toward the larger end of the screen. Due to the nature of this internal screen surface, some of the solids, being substantially the same size as the openings or spacings in the screen, tend to become lodged within these openings, thus clogging the screen, and reducing the effectiveness of the separation process. Thus liquid is not able to pass through the spacings in the screen, and therefore discharges in an axial direction toward the larger end of the screen, thereby reducing the overall effectiveness of the separation process.

SUMMARY OF THE INVENTION

The present invention relates generally to a frustoconically shaped centrifuge screen which is adapted to rotate about its axis while a mixture to be separated is introduced into the smaller end of the screen. The screen is formed from a series of graduated annular sections formed of wire of bar stock, the sections having increasing diameters as they proceed from the smaller end of the larger end thereof; the wire may be of any desired cross section. If the screen is formed from a continuous piece of wire, the wire is helically wound about the axis of rotation to form a series of plurality of convoluted annular sections of increasing diameter extending in a direction from the smaller end of the screen to the larger end thereof. The annular sections are arranged so that when the screen is formed the innermost surfaces or points of the sections form a "-stepped" axial diverging passageway; in the present embodiment the innermost surface of each section is flat or substantially flat, and located outwardly of, the previous section. With a screen of this form, solids spill from one annular section to the next, jumping the gaps or spaces between the sections, and will not tend to be dragged into these spaces, while liquid will drain through these spaces. The problem of clogging of the gaps or spaces between successive sections is thereby minimized, thus greatly increasing the effectiveness of the separation process.

A primary advantage of this invention as compared with previous bar screens, is that the open area of the screen can be greatly increased without loss of fine material because the solids tend to jump from one section to the next. That is, solid particles are deflected as they slide from one annular section to the next, and thus are not dragged through the slots or gaps within the screen. Thus, for a given size opening, less fine material is lost than in prior art bar screens; or for a given loss, a screen constructed according to the present invention can have greater gaps or spacings than heretofore possible. Also, the efficiency of the separation process is higher with the present screen because solids will not become lodged within the openings or gaps as with previous screens having internal conical or frustoconical surfaces.

The exact shape of the screen, although shown as frustoconical in the present embodiment, may be of any convenient or desired shape. Also, in stated above, the screen may be formed from a plurality of individual rings, each ring being of a larger diameter than the previous ring, or it may be constructed of a singular piece of wire helically wound about the axis of rotation to form a series of convoluted annular sections of increasing diameters. Further advantages of the invention will be apparent from the reading of the following specification which includes drawings of structure embodying the invention.

DESCRIPTION OF THE PREFERRED EMBODIMENT

Briefly, the invention relates to a screen centrifuge having means mounting it for rotation about its axis, and feed means disposed within the screen. The feed means is disposed so as to introduce a mixture to be separated into the smaller end of the screen.

Figure 1:
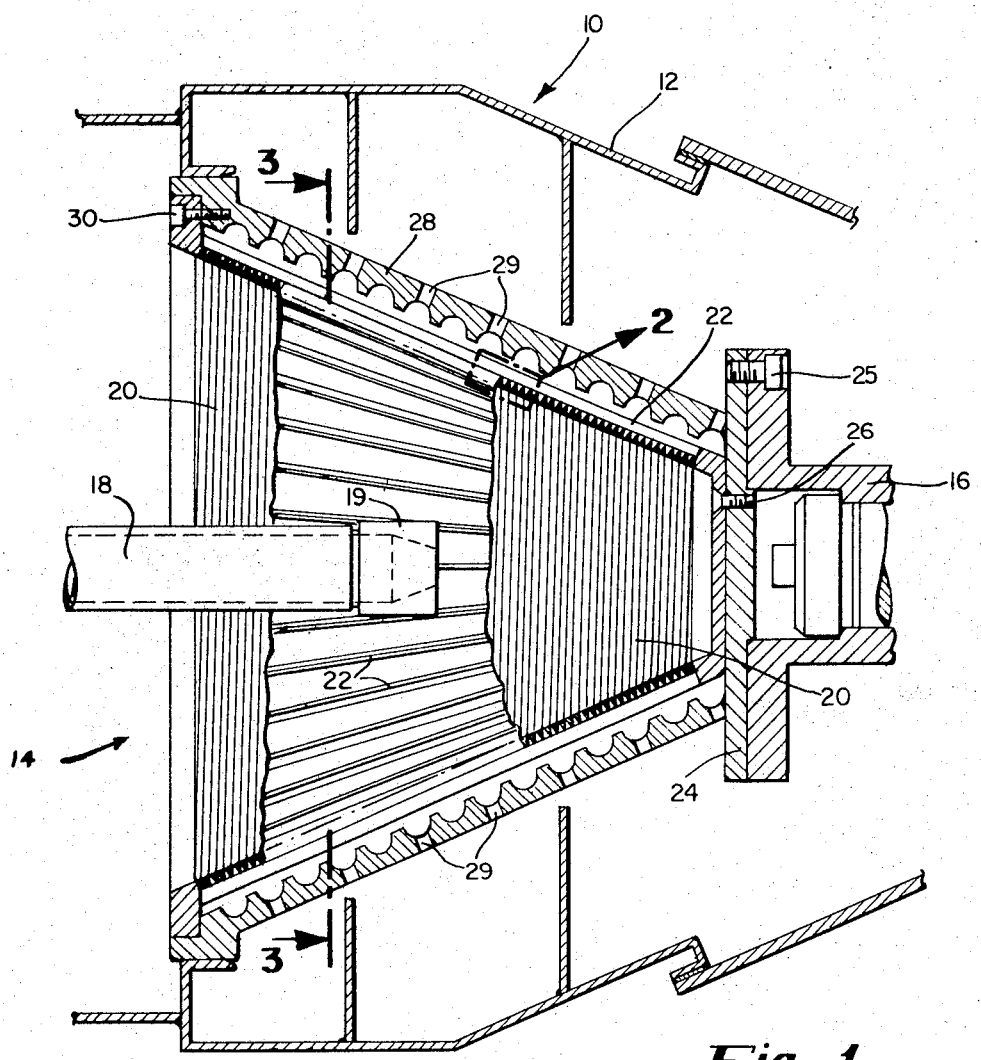
FIG. 1 is a fragmentary sectional view of an apparatus or centrifuge embodying the invention.

Referring to FIG. 1, apparatus embodying the invention is designated generally by the numeral 10. This apparatus includes a casing 12 in which is disposed a centrifuge screen assembly 14. Screen 14 is mounted on shaft 16 which is supported by means not shown. Drive means (also not shown) are provided.

The feed means comprises a stationary feed tube 18 disposed within the interior of the screen, and mounted along the rotational axis thereof. This feed means includes a nozzle 19 which directs the mixture to be separated along the axis toward the small end of the screen.

In operation, the feed is deliquefied as it moves down the screen toward the larger end thereof, the liquid passing through the openings or spaces in the screen assembly. The screening member per se is comprised of a continuous length of wire 20, this length of wire being helically wound about the axis of rotation along which the feed means or tube 18 extends. The wire 20 is helically wound, and resistance welded to a plurality of generally axially extending and circumferentially spaced ribs 22 which extend between the ends of screen assembly 14. The screen assembly is mounted to an end plate 24 by a plurality of screws 26, end plate 24 being secured to shaft 16 by a plurality of screws 25. Surrounding screen assembly 14 is a member 28 having a plurality of openings 29 arranged therein to allow liquid which drains through screen assembly 14 to pass into the space enclosed by casing 12. Screen assembly 14 is secured at its large end to member 28 by a plurality of screws 30. Alternatively, member 28 can be eliminated, and a plurality of annular members may surround ribs 22, these members being welded to the ribs.

Figure 2:
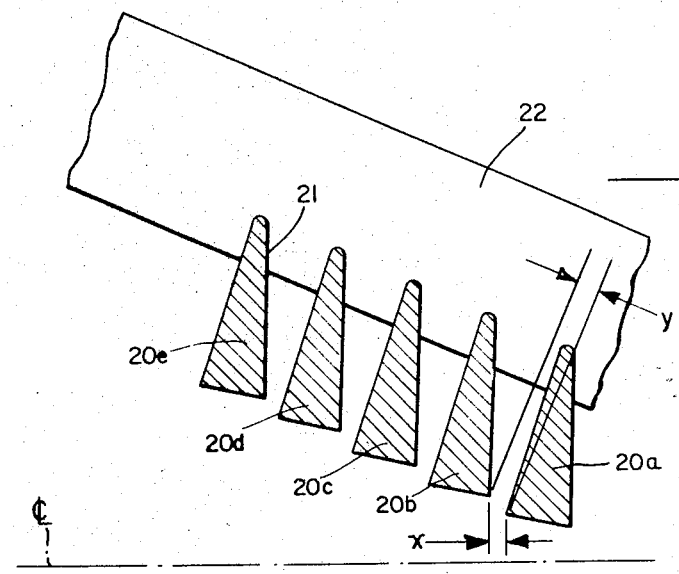
FIG. 2 is an enlarged sectional view taken along line 2 of FIG. 1 showing the details of the centrifuge screen per se.
Figure 3:
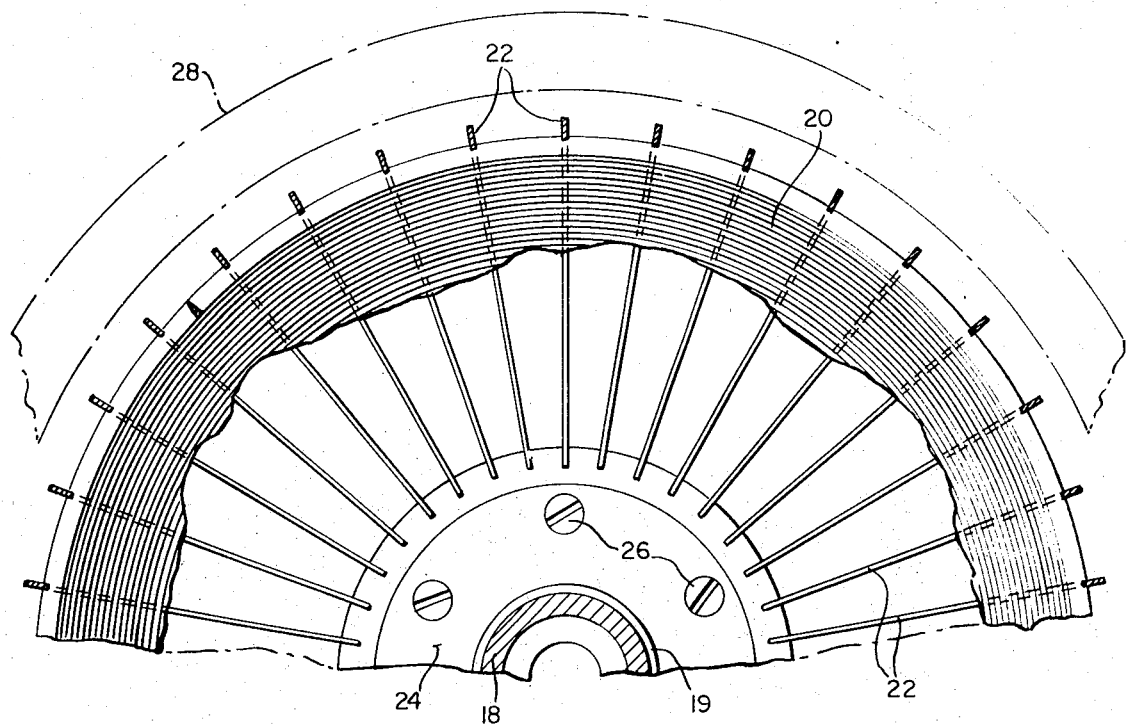
FIG. 3 is a sectional view taken through line 3—3 of FIG. 1.

Focusing now on the specific area of the invention, the screen includes a plurality of annular sections disposed about the horizontal axis of rotation (see FIG. 2) to form a diverging "stepped" axial passageway. As can be seen in FIG. 2, the annular sections are numbered 20a through 20e. As stated above, the wire 20 is resistance welded to a plurality of ribs 22, and is shown in a greatly exaggerated fashion in FIG. 2. The portion 21, shown as being imbedded within ribs 22, is actually small in relation to the various cross sectional dimensions of wire 20. This imbedded portion 21 actually results from welding ribs 22 to the outermost surface of wire 20 while the latter is wound about a cone-shaped mandrel mounted to a lathe during the manufacturing of the screen assembly.

When utilizing a single length of wire 20 to form the screen, the wire is helically wound about the axis of rotation as stated above, and an annular section is defined as one convolution of the screen. Annular sections 20a through 20e can also be formed by constructing the screen from a plurality of individual rings of increasing diameters, each annular section then being an individual ring. In either case, the resulting screen is in the form of a stepped diverging axial passage.

It can be seen in FIG. 2 that in proceeding from the smaller to the larger end of screen 14, the innermost surface of each annular section is flat, located outwardly of, and nonplanar with the innermost surface of the preceding section. For example, the innermost surface of section 20b is located outwardly of that of section 20a, that of section 20c is located outwardly of that of section 20b, etc. And as stated above, the outermost surface of each annular section contacts ribs 22. It is also within the scope of the present invention to utilize ribs 22 only as outer restraining members without actually welding the latter to wire 20. Thus, wire 20 can be helically wound to the desired shape, contained between two end members, and restrained by contacting ribs 22, the latter extending between the end members.

It is noted that each annular section is spaced in two directions, i.e., an "x" or axial direction, and a "y" or lateral direction. The x or axial spacing is the distance between the leading edge of one section, and the trailing edge of the next section in a direction parallel to the axis of rotation. For example, in FIG. 2, x is shown as indicating the axial distance between the leading edge of section 20a, and the trailing edge of section 20b. This axial spacing may be of any desired dimension, including zero. A zero axial spacing also includes a screen in which the leading edge of a preceding section actually overlaps the trailing edge of the next section.

The y or lateral spacing between adjacent sections is the distance between the leading edge of one section and the trailing edge of the next in a direction parallel to the surface generated by the annular sections.

It is also noted that in the embodiment shown in FIG. 2, each annular section has a triangular cross section, and thus the adjacent lateral surfaces of adjacent sections, e.g., those of sections 20a and 20b, extend away from each other in a direction extending toward ribs 22. Thus, if a solid particle, small enough to pass between adjacent annular sections, begins to move outwardly through screen 14, it will continue to do so because of the expanding passageway between the sections.

Figure 4:
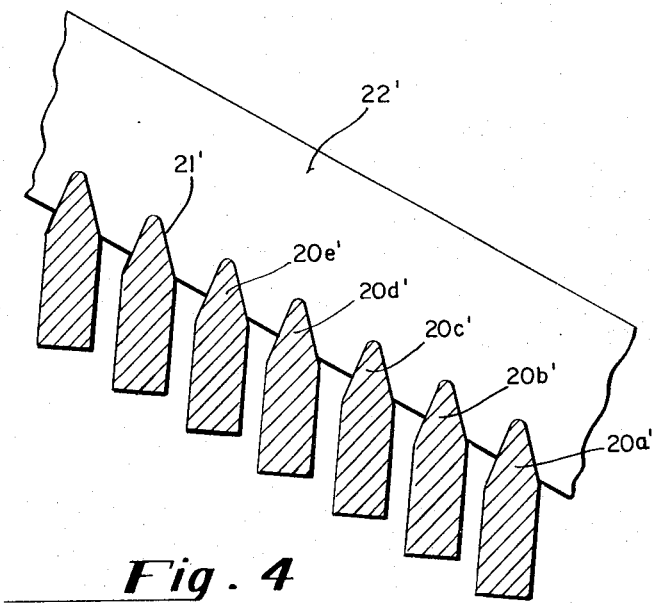
FIG. 4 is an enlarged fragmentary sectional view similar to FIG. 2, but showing a modification of the invention.

The modification illustrated in FIG. 4 is alike in all respects to that just described, except that adjacent lateral surfaces of the annular sections 20a' through 20e' are parallel to each other. As stated above, the cross section of the wire utilized to form the screen may assume any desired form.

Depending upon the characteristics of the mixture or material to be separated, the axial and lateral spacings may vary, as may the overall shape of screen 14. Although illustrated as a truncated cone in the present embodiment, the screens may assume any desired form with corresponding $x$ and $y$ spacings. For example, the screen may be formed as as to have two truncated cone portions, the first being similar to the present screen embodiment, the section portion beginning at what is the large end of the present embodiment, and extending beyond at a greater angle with the axis of rotation than the first portion. Also, the screen may be formed so as to be curved as it extends from the smaller to the larger end.

As a mixture is introduced via nozzle 19 to the smaller end of rotating screen 14, it is thrown outwardly toward the screen, spreading over the periphery thereof, the liquid passing through the spacings within the screen, while solids pass axially down the "steps," and spill from one section to the next, thus jumping the gaps or spacings between sections. The solids particles jump the gaps between sections due to their momentum, while the liquid escapes through the spaces between sections. The discharge of liquid through these spaces is assisted by air which tends to be drawn in the large end of the screen as a result of the rotation thereof. This air tends to force the lighter material (liquid) through the spaces between sections, while solids, being heavier, progress axially toward the large end of the screen. In some centrifuges, solids will be discharged from the large end of the screen onto a cylindrical screen.

Although shown as a sharp corner (FIG. 2), the leading edge of each of the annular sections may be slightly rounded if desired. This would tend to produce a "Coanda effect," and further assist in discharging liquid through the spaces between sections as the solids proceed axially toward and are discharged from the large end of the screen. Also, although member 28 appears to be in contact with casing 12 at the large end of screen assembly 14, there is actually a slight annular clearance therebetween.

Although I have described my invention with a certain degree of particularity, it is understood that the present disclosure has been made only by way of example, and that numerous changes in the details of construction and combination and arrangement of parts may be resorted to without departing from the spirit and scope of the invention as hereinafter claimed. For example, the screen might be constructed from two or more continuous lengths of wire. Thus, two lengths of wire might be used to generate a form similar to a multiple start screw thread, i.e., the two wires would start 180°apart, parallel each other, and terminate 180°apart. In proceeding from the small to the large end of such a screen, solids would alternately contact the innermost surfaces of annular sections formed by each of the two wires. Each of the wires would be helically wound in the same manner as described above, each wire being disposed in the spaces generated by the other.

What is claimed is:

1. A screen for a centrifuge bowl, said screen being adapted for rotation about an axis, said being formed of wire, and including a plurality of annular sections, said sections increasing in diameter in a direction extending along said axis from one end of said screen to the other, each section being laterally spaced apart from the preceding section to form therebetween a substantially uninterrupted annular passage way for the passage of liquid free of solids, said screen further including a plurality of circumferentially spaced ribs extend from said one end of said screen to the other, said ribs contacting the outermost surface of each section and secured thereto for supporting said sections, the innermost surface of each section being flat, and disposed outwardly of, that of the preceding section proceeding in a direction from said one end to said other end of said screen, and the adjacent edges of the flat surfaces of adjacent sections being spaced laterally from each other so as to form a stepped diverging axial passage for a liquid-solids mixture introduced near the smaller end of said screen during the rotation thereof, whereby solids, in their passage from said one end to said other end of the screen, jump laterally outwardly from one annular section to the next while liquid escapes through the annular passageway between the sections.

2. A screen according to claim 1 wherein each section is also axially spaced apart from the preceding section.

3. A screen according to claim 1 wherein the axial spacing between adjacent sections is zero.

4. A screen according to claim 2 wherein said screen is in the form of a truncated cone, and wherein adjacent lateral surfaces of adjacent sections extend away from each other in a direction approaching said ribs to provide a diverging passageway.

5. A screen according to claim 3 wherein said screen is in the form of a truncated cone, and wherein adjacent lateral surfaces of adjacent sections extend away from each other in a direction approaching said ribs to provide a diverging passageway.

* * * * *

O-1050
(5/69)

UNITED STATES PATENT OFFICE
CERTIFICATE OF CORRECTION

Patent No. 3,630,379     Dated December 28, 1971

Inventor(s) Thomas Davy Sharples

It is certified that error appears in the above-identified patent and that said Letters Patent are hereby corrected as shown below:

In column 2, line 37, "in" should be changed to - as -.

In column 3, line 43, - and - should be inserted before "located", and ", and nonplanar" should be cancelled.

In column 4, line 16, "as" (first occurence) should be changed to - so -.

In line 2 of claim 1, - screen - should be inserted after "said".

In line 7 of claim 1, "passage way" should be changed to - passageway -.

In line 9 of claim 1, "extend" should be changed to - extending -.

In line 13 of claim 1, - imperforate, and - should be inserted after "flat, ".

Signed and sealed this 13th day of June 1972.

(SEAL)
Attest:

EDWARD M. FLETCHER, JR.
Attesting Officer

ROBERT GOTTSCHALK
Commissioner of Patents